US012572760B2

(12) United States Patent
Sun et al.

(10) Patent No.: US 12,572,760 B2
(45) Date of Patent: Mar. 10, 2026

(54) TRANSLATION PROCESSING METHOD, APPARATUS, DEVICE AND MEDIUM

(71) Applicant: Beijing Youzhuju Network Technology Co., Ltd., Beijing (CN)

(72) Inventors: Zewei Sun, Beijing (CN); Mingxuan Wang, Beijing (CN); Lei Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 162 days.

(21) Appl. No.: 18/565,946

(22) PCT Filed: Jul. 26, 2022

(86) PCT No.: PCT/CN2022/107981
§ 371 (c)(1),
(2) Date: Nov. 30, 2023

(87) PCT Pub. No.: WO2023/011260
PCT Pub. Date: Feb. 9, 2023

(65) Prior Publication Data
US 2024/0265214 A1 Aug. 8, 2024

(30) Foreign Application Priority Data
Aug. 3, 2021 (CN) .......................... 202110888353.X

(51) Int. Cl.
*G06F 40/58* (2020.01)
*G06N 3/08* (2023.01)
(52) U.S. Cl.
CPC ............... *G06F 40/58* (2020.01); *G06N 3/08* (2013.01)

(58) Field of Classification Search
CPC .......... G06F 40/58; G06F 40/30; G06F 40/44; G06F 40/40; G06F 40/211; G06N 3/08; G06N 3/045; G06N 3/084
See application file for complete search history.

(56) References Cited

U.S. PATENT DOCUMENTS

2017/0060855 A1 3/2017 Song et al.

FOREIGN PATENT DOCUMENTS

CN 106484681 A 3/2017
CN 108829685 A 11/2018
(Continued)

OTHER PUBLICATIONS

International Search Report in PCT/CN2022/107981, mailed Sep. 21, 2022, 5 pages.
(Continued)

*Primary Examiner* — Yogeshkumar Patel
(74) *Attorney, Agent, or Firm* — Astute IP Law Group

(57) ABSTRACT

Embodiments of the present disclosure relate to a translation processing method and apparatus, a device and a medium. The method comprises: generating a multilingual representation model by training according to a monolingual corpus of each language among a plurality of languages, and generating a multilingual generation model according to the monolingual corpus of each language; concatenating the multilingual representation model and the multilingual generation model with a first translation model respectively to generate a target model to be trained; and generating a second translation model by training the target model according to a bilingual corpus among the plurality of languages, and performing translation processing on target information to be processed, according to the second translation model.

16 Claims, 6 Drawing Sheets

Generate a multilingual representation model by training according to a monolingual corpus of each language among a plurality of languages, and generate a multilingual generation model according to the monolingual corpus of each language — 101

Concatenate the multilingual representation model and the multilingual generation model with a first translation model respectively to generate a target model to be trained — 102

Generate a second translation model by training the target model according to a bilingual corpus among the plurality of languages, and perform translation processing on target information to be processed, according to the second translation model — 103

(56)                    References Cited

FOREIGN PATENT DOCUMENTS

| | | | | | |
|----|------------|---|---|--------|-----------------|
| CN | 110874537  | A | * | 3/2020 | |
| CN | 111159416  | A |   | 5/2020 | |
| CN | 111178094  | A | * | 5/2020 | ............ G06N 3/048 |
| CN | 111382580  | A |   | 7/2020 | |
| CN | 111460838  | A |   | 7/2020 | |
| CN | 111680529  | A | * | 9/2020 | ............ G06F 40/30 |
| CN | 113591498  | A |   | 11/2021 | |
| WO | 2017035382 | A1 |  | 3/2017 | |

OTHER PUBLICATIONS

Office Action in CN202110888353.X, mailed Nov. 14, 2022, 8 pages.

* cited by examiner

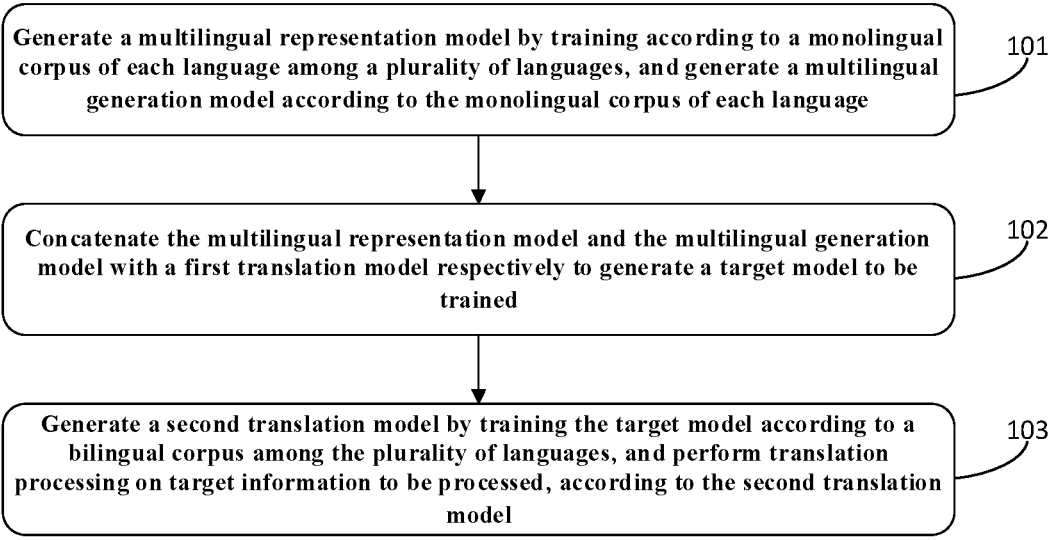

Generate a multilingual representation model by training according to a monolingual corpus of each language among a plurality of languages, and generate a multilingual generation model according to the monolingual corpus of each language   101

Concatenate the multilingual representation model and the multilingual generation model with a first translation model respectively to generate a target model to be trained   102

Generate a second translation model by training the target model according to a bilingual corpus among the plurality of languages, and perform translation processing on target information to be processed, according to the second translation model   103

Fig.1

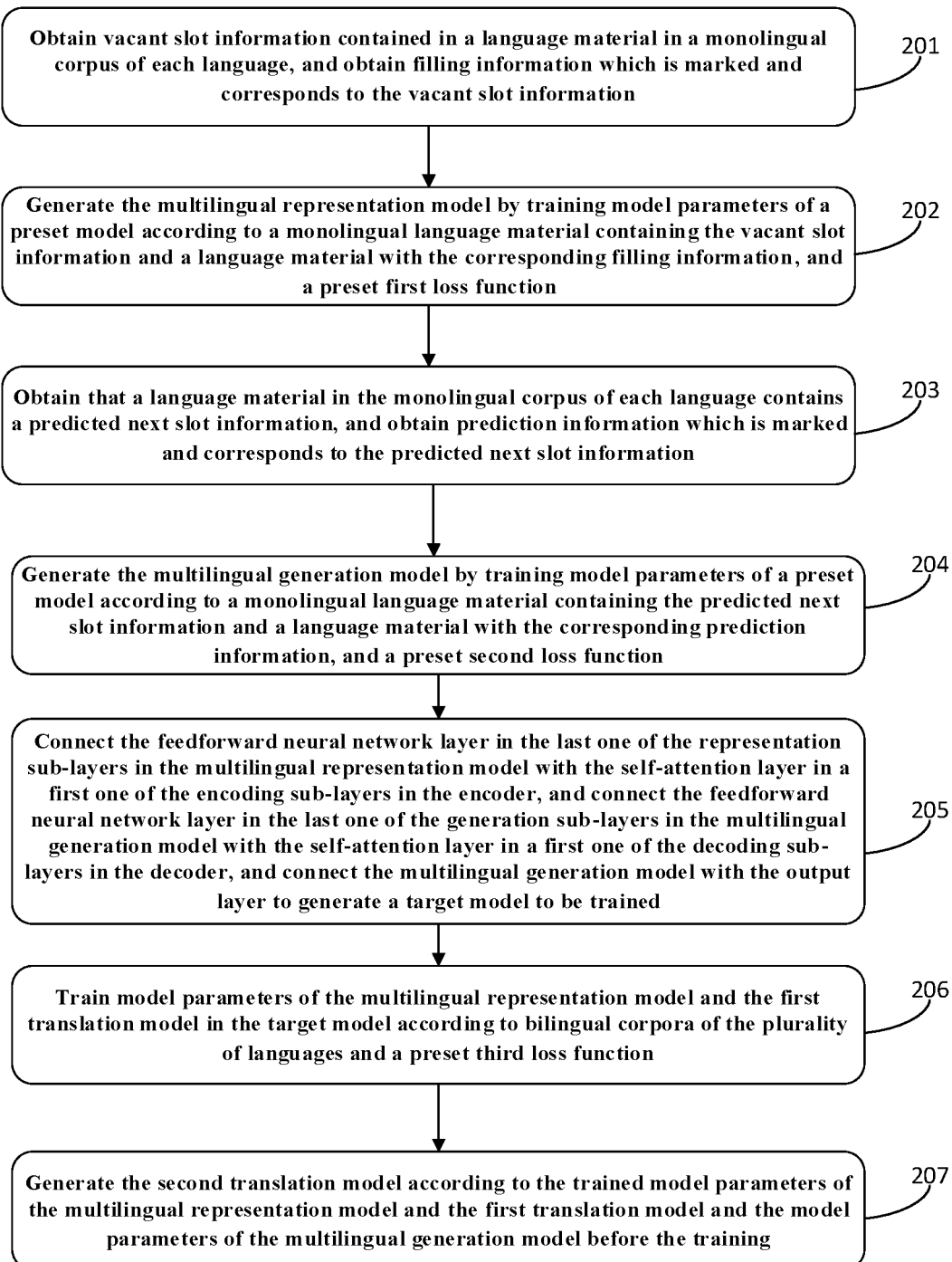

Obtain vacant slot information contained in a language material in a monolingual corpus of each language, and obtain filling information which is marked and corresponds to the vacant slot information    201

Generate the multilingual representation model by training model parameters of a preset model according to a monolingual language material containing the vacant slot information and a language material with the corresponding filling information, and a preset first loss function    202

Obtain that a language material in the monolingual corpus of each language contains a predicted next slot information, and obtain prediction information which is marked and corresponds to the predicted next slot information    203

Generate the multilingual generation model by training model parameters of a preset model according to a monolingual language material containing the predicted next slot information and a language material with the corresponding prediction information, and a preset second loss function    204

Connect the feedforward neural network layer in the last one of the representation sub-layers in the multilingual representation model with the self-attention layer in a first one of the encoding sub-layers in the encoder, and connect the feedforward neural network layer in the last one of the generation sub-layers in the multilingual generation model with the self-attention layer in a first one of the decoding sub-layers in the decoder, and connect the multilingual generation model with the output layer to generate a target model to be trained    205

Train model parameters of the multilingual representation model and the first translation model in the target model according to bilingual corpora of the plurality of languages and a preset third loss function    206

Generate the second translation model according to the trained model parameters of the multilingual representation model and the first translation model and the model parameters of the multilingual generation model before the training    207

TRANSLATION PROCESSING METHOD, APPARATUS, DEVICE AND MEDIUM

CROSS REFERENCE TO RELATED APPLICATIONS

The present application is a national stage application filed under 35 U.S.C. 371 based on International Patent Application No. PCT/CN2022/107981, filed Jul. 26, 2022, which claims priority to the Chinese patent application No. 202110888353.X filed on Aug. 3, 2021, the disclosures of which are incorporated herein by reference in their entireties.

FIELD

The present disclosure relates to the technical field of deep learning, and particularly to translation processing method, apparatus, device and medium.

BACKGROUND

With the development of deep learning technology, a translation model may be used to perform translation of natural languages through the deep learning technology. However, sentences generated by a conventional translation model still have drawbacks in accuracy.

Therefore, there is a problem currently to be solved to improve the accuracy of the sentences generated by the translation model and thus improve the translation quality.

SUMMARY

To address or at least partially address the above technical problems, the present disclosure provides a translation processing method and apparatus, a device and a medium.

In a first aspect, the present disclosure provides a translation processing method, comprising:

generating a multilingual representation model by training according to a monolingual corpus of each language among a plurality of languages, and generating a multilingual generation model according to the monolingual corpus of each language;

concatenating the multilingual representation model and the multilingual generation model with a first translation model respectively to generate a target model to be trained;

generating a second translation model by training the target model according to a bilingual corpus among the plurality of languages, and performing translation processing on target information to be processed, according to the second translation model.

In an optional embodiment, generating a multilingual representation model by training according to a monolingual corpus of each language among a plurality of languages comprises:

obtaining vacant slot information contained in a language material in a monolingual corpus of each language, and obtaining filling information which is marked and corresponds to the vacant slot information;

generating the multilingual representation model by training model parameters of a preset model according to a monolingual language material containing the vacant slot information and a language material with the corresponding filling information, and a preset first loss function.

In an optional embodiment, generating a multilingual generation model according to the monolingual corpus of each language comprises:

obtaining that a language material in the monolingual corpus of each language contains a predicted next slot information, and obtaining prediction information which is marked and corresponds to the predicted next slot information;

generating the multilingual generation model by training model parameters of a preset model according to a monolingual language material containing the predicted next slot information and a language material with the corresponding prediction information, and a preset second loss function.

In an optional embodiment, the multilingual representation model comprises a cascade of one or more representation sub-layers, wherein each of the representation sub-layers comprises: a self-attention layer connected with a feedforward neural network layer.

In an optional embodiment, the multilingual generation model comprises a cascade of one or more generation sub-layers, wherein each of the generation sub-layers comprises: a self-attention layer connected with a feedforward neural network layer.

In an optional embodiment, the first translation model comprises an encoder, a decoder and an output layer, wherein the encoder comprises a cascade of one or more encoding sub-layers, wherein each of the encoding sub-layers comprises: a self-attention connected with and a feedforward neural network layer;

the decoder comprises a cascade of one or more decoding sub-layers, wherein each of the decoding sub-layers comprises: a self-attention layer connected with a cross-attention layer, and the cross-attention layer is connected with feedforward neural network layer, wherein the feedforward neural network layer in the last one of the encoding sub-layers is connected with the cross-attention layer in the last one of the decoding sub-layers.

In an optional embodiment, concatenating the multilingual representation model and the multilingual generation model with a first translation model respectively to generate a target model to be trained comprises:

connecting the feedforward neural network layer in the last one of the representation sub-layers in the multilingual representation model with the self-attention layer in a first one of the encoding sub-layers in the encoder, and connecting the feedforward neural network layer in the last one of the generation sub-layers in the multilingual generation model with the self-attention layer in a first one of the decoding sub-layers in the decoder, and connecting the multilingual generation model with the output layer to generate a target model to be trained.

In an optional embodiment, generating a second translation model by training the target model according to a bilingual corpus among the plurality of languages comprises:

training model parameters of the multilingual representation model and the first translation model in the target model according to bilingual corpora of the plurality of languages and a preset third loss function;

generating the second translation model according to the trained model parameters of the multilingual representation model and the first translation model and the model parameters of the multilingual generation model before the training.

In a second aspect, the present disclosure provides a translation processing apparatus, comprising:

a first generation module configured to generate a multilingual representation model by training according to a monolingual corpus of each language among a plurality of languages, and generate a multilingual generation model according to the monolingual corpus of each language;

a second generation module configured to concatenate the multilingual representation model and the multilingual generation model with a first translation model respectively to generate a target model to be trained;

a third generation module configured to generate a second translation model by training the target model according to a bilingual corpus among the plurality of languages, and perform translation processing on target information to be processed, according to the second translation model.

In a third aspect, the present disclosure provides a computer-readable storage medium storing instructions therein which, when executed on a terminal device, cause the terminal device to implement the above method.

In a fourth aspect, the present disclosure provides an electronic device, comprising: a processor; a memory for storing instructions executable by the processor; the processor is configured to read the executable instructions from the memory and execute the instructions to implement the above method.

In a fifth aspect, the present disclosure provides a computer program product comprising a computer program/instructions which, when executed by a processor, implement the above method.

Technical solutions according to embodiments of the present disclosure have the following advantages over the prior art:

In the embodiments of the present disclosure, the monolingual corpora of the plurality of languages is used to train the model, and the ability of the model to process the corpora of different languages is improved; the vector generated by the trained multilingual representation model may more accurately extract the features of the sentence to be translated and more accurately represent the meaning of the sentence to be translated; the trained multilingual generation model can more accurately perform vector representation on the already translated sentence and extract the sentence features of the already translated sentence so as to more accurately predict subsequent sentences to be translated. The above-mentioned two models are concatenated with the first translation model, and trained to obtain the second translation model. On the basis of having the translation capability of the first translation model, the second translation model improves the translation accuracy and thereby enhances the translation quality as concatenating the multilingual representation model and the multilingual generation model.

BRIEF DESCRIPTION OF THE DRAWINGS

The above and other features, advantages, and aspects of embodiments of the present disclosure will become more apparent with reference to the following figures and detailed embodiments. Throughout the figures, the same or similar reference numerals indicate the same or similar elements. It should be understood that the figures are diagrammatic and that elements are not necessarily drawn to scale.

FIG. 1 is a flow chart of a translation processing method according to an embodiment of the present disclosure;

FIG. 2 is a flow chart of another translation processing method according to an embodiment of the present disclosure;

DETAILED DESCRIPTION OF EMBODIMENTS

Figure 3:
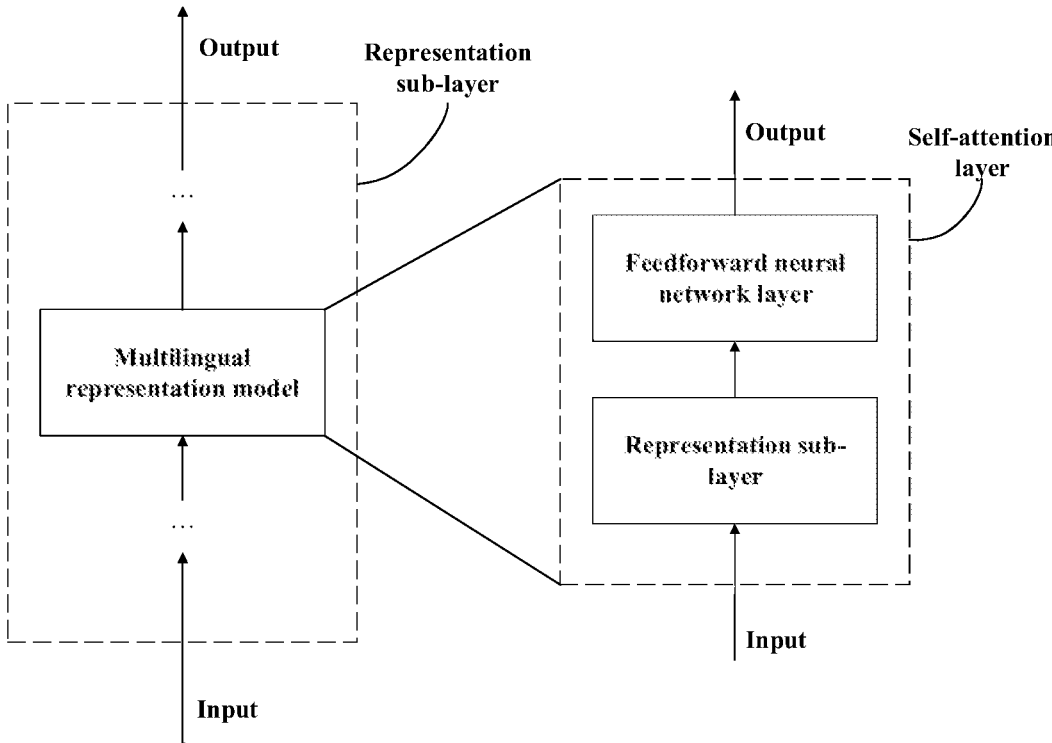
FIG. 3 is a schematic structural diagram of a multilingual representation model according to an embodiment of the present disclosure.

Hereinafter, embodiments of the present disclosure will be described in more detail with reference to the accompanying drawings. While certain embodiments of the present disclosure have been illustrated in the accompanying drawings, it is to be understood that the disclosure may be embodied in various forms and should not be construed as being limited to the embodiments set forth herein; rather, these embodiments are provided to help understand the present disclosure more thoroughly and completely. It should be understood that the drawings and examples of the present disclosure are for illustrative purposes only and are not intended to limit the scope of the present disclosure.

It should be understood that the various steps recited in method embodiments of the present disclosure may be performed in a different order and/or in parallel. Moreover, the method embodiments may comprise additional steps and/or omit performing the steps shown. The scope of the present disclosure is not limited in this respect.

As used herein, the terms "comprise", and variations thereof are open-ended terms, i.e., "comprise, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that concepts such as "first" and "second" mentioned in the present disclosure are only intended to distinguish between different devices, modules, or units and are not intended to limit the order or interdependence of the functions performed by the devices, modules, or units.

It needs to be appreciated that the modifier "a" or "an" in the present disclosure are intended to be illustrative and not restrictive, and those skilled in the art should understand that the modifier should be understood as "one or more" unless the context clearly indicates otherwise.

The names of messages or information interacted between devices in embodiments of the present disclosure are for illustrative purposes only and are not intended to limit the scope of such messages or information.

To solve the above problems, embodiments of the present disclosure provide a translation processing method. The method will be introduced hereunder in conjunction with specific embodiments.

FIG. 1 is a flow chart of a translation processing method according to an embodiment of the present disclosure. The method may be performed by a translation processing apparatus, wherein the apparatus may be implemented by software and/or hardware, and may be typically integrated in an electronic device. As shown in FIG. 1, the method comprises:

Step 101: generating a multilingual representation model by training according to a monolingual corpus of each language among a plurality of languages, and generating a multilingual generation model according to the monolingual corpus of each language.

To enable the trained translation model to more accurately translate as many words as possible in various languages, the training corpus in embodiments of the present disclosure comprises a monolingual corpus of each language among a plurality of languages. The monolingual corpus means that the corpus is a single type of language corpus; in order to enable the model to have the ability to process a plurality of languages, the model is trained with the monolingual corpus of each language in the plurality of languages, wherein each language may correspond to one or more monolingual corpora; for example, if the plurality of languages are English and Japanese, the corresponding plurality of monolingual corpora include an English monolingual corpus and a Japanese monolingual corpus which are as rich as possible in terms of vocabulary.

Furthermore, the multilingual representation model and the multilingual generation model are trained using the monolingual corpus of each language among the plurality of languages. Therefore, it is possible to, through the multilingual representation model obtained by training with the monolingual corpus of each language which is as rich as possible in terms of vocabulary, perform vector representation for a sentence to be translated more accurately, extract features of the sentence to be translated, and thereby more accurately represent the meaning of the sentence to be translated. Meanwhile, it is possible to, through the multilingual generation model obtained by training with the monolingual corpus of each language which is as rich as possible in terms of vocabulary, perform vector representation for the already-translated sentence more accurately, extract features of the already-translated sentence, and thereby predict subsequent sentences to be translated more accurately. Based on the multilingual representation model and multilingual generation model obtained by training with the monolingual corpus which is as rich as possible in terms of vocabulary, more accurate vector conversion may be performed for the vocabulary in the translation process, and more accurate semantic features may be extracted so that the translation result is more accurate. It needs to be appreciated that in the present embodiment, the multilingual representation model may be selected according to application scenarios, and is not limited in the present embodiment, for example, multilingual Bidirectional Encoder Representations from Transformers (mBERT). In the present embodiment, the multilingual generation model may be selected according to application scenarios, and is not limited in the present embodiment, for example: multilingual Generative Pre-Training (mGPT), or Generative Adversarial Network model.

Step 102: concatenating the multilingual representation model and the multilingual generation model with a first translation model respectively to generate a target model to be trained.

In the present embodiment, the first translation model is a sequence-to-sequence model. There are a variety of first translation models. The first translation model may be selected and designed by those skilled in the art according to the application scenario, and is not limited in the present embodiment. The first translation model comprises an encoder and a decoder, wherein the encoder is used for performing encoding processing on the sentence to be translated to obtain a vector; the decoder is used for performing a decoding process on the vector, to obtain a translation result.

It may be understood that the first translation model can be used to perform translation processing on the input corpus. However, since the model training of the first translation model is generally limited by a bilingual corpus with relatively limited vocabulary, the accuracy of the translation performed by the first translation model still needs to be improved. Therefore, the multi-lingual representation model and the multi-lingual generation model, which are trained with the monolingual corpus with more vocabulary than the bilingual corpus, may be concatenated with the first translation model to generate a target model to be trained, so as to improve the accuracy of the subsequent translation processing.

There are various manners of concatenating the multilingual representation model and the multilingual generation model with the first translation model respectively, for example, the encoder of the first translation model is concatenated after the multilingual representation model, and the decoder of the first translation model is concatenated after the multilingual generation model. The manners are not limited in the present embodiment. It needs to be appreciated that methods of concatenating the multilingual representation model and the multilingual generation model having different structures with the first translation model are different, and the performances of the target models generated by different concatenating methods are different. Those skilled in the art may select the concatenating method according to the model structure and the application scenario, which will not be described in detail herein.

Step 103: generating a second translation model by training the target model according to a bilingual corpus among the plurality of languages, and performing translation processing on target information to be processed, according to the second translation model.

In order to train the target model to enable it have the ability to translate the plurality of languages, in embodiments of the present disclosure, the target model is trained using a bilingual corpus of the plurality of languages. Here, the bilingual corpus refers to a corpus in which there are two languages, and the corpora of the two languages are in a translation relationship with each other, for example: Chinese-Japanese bilingual corpus, Chinese-English bilingual corpus. For example, if the corpus is a Chinese-English bilingual corpus in which the Chinese language material "我爱你" exists, the corresponding English language material is "I love you".

Furthermore, the target model is trained according to the bilingual corpus in the plurality of languages; one of the corresponding two language materials serves as an input of the target model and the other serves as an output of the target model; the second translation model generated by training has the ability to perform translation processing on the corpora of the plurality of languages, thus the second translation model may be used to perform translation processing on the target information to be processed.

In summary, by the translation processing method of the embodiments of the present disclosure, a monolingual corpus of the plurality of languages is used to train a model, and the ability of the model to process the corpus of different languages is improved; the vector generated by the trained multilingual representation model may more accurately extract the features of the sentence to be translated and more accurately represent the meaning of the sentence to be translated; the trained multilingual generation model can more accurately perform vector representation on the already translated sentence and extract the sentence features of the already translated sentence so as to more accurately predict subsequent sentences to be translated. The above-mentioned two models are concatenated with the first translation model, and trained to obtain the second translation model. On the basis of having the translation capability of the first translation model, the second translation model improves the translation accuracy and thereby enhances the translation quality as concatenating the multilingual representation model and the multilingual generation model.

Furthermore, the multilingual representation model and the multilingual generation model are generated by training with the monolingual corpus, the second translation model is generated by training with the multilingual corpus, and the model is trained from the perspective of the plurality of languages by using multiple corpora, so that the translation capability of the second translation model is improved.

Based on the above embodiment, detailed illustration will be presented below through the embodiment shown in FIG. 2 in order to more clearly explain how to generate the multilingual representation model and the multilingual generation model according to the monolingual corpora of the plurality of languages, and how to generate the second translation model having a better translation capability by training after concatenating the multilingual representation model and the multilingual generation model with the first translation model respectively. FIG. 2 is a flow chart of another translation processing method according to an embodiment of the present disclosure. Specifically, the translation processing method according to the embodiment of the present disclosure comprises:

Step 201: obtaining vacant slot information contained in a language material in a monolingual corpus of each language, and obtaining filling information which is marked and corresponds to the vacant slot information.

In the present embodiment, in order to enable the multilingual representation model to accurately perform vector representation on the sentence to be translated, extract the features of the sentence to be translated, and thereby accurately represent the meaning of the sentence to be translated, the multilingual representation model is trained in conjunction with the context. In an alternative embodiment, the model is trained using the corpus with the vacant slot information and its corresponding filling information to generate the multilingual representation model.

In the present embodiment, vacancy processing is performed on the corpus in the monolingual corpus of each language, and the vacancy processing refers to vacancy of one or more words in the language material. The position of the one or more words in the corpus is not limited in the present embodiment. After the vacancy processing on the corpus is performed, the corpus with the vacant slot information and its corresponding filling information are obtained, wherein the vacant slot information refers to information about recording a vacancy position in the corpus, and the filling information refers to a language material obtained after performing filling processing on the vacancy position. For example, if the language material before the vacancy processing is "我中午吃了包子 (I eat a bun at noon.)", the language material containing the vacant slot information may be "我中午＊了包 子 (I * a bun at noon.)", wherein "＊" represents the vacant slot information, and the filling information corresponding to the vacant slot information is "我中午吃了包子".

Step 202: generating a multilingual representation model by training model parameters of a preset model according to a monolingual language material containing the vacant slot information and a language material with the corresponding filling information, and a preset first loss function.

In the present embodiment, the first loss function is used to evaluate a difference between a predicted value and a real value of the model to converge a training result of the model. Under the constraint of the first loss function, the model parameters of the preset model are trained using the monolingual language material containing the vacant slot information and the language material with the corresponding filling information, to generate the multilingual representation model. It may be understood that through the vector generated by the multilingual representation model in conjunction with the context, the meaning conveyed by the vector is closer to the real meaning to be translated. It should be appreciated that the language materials for training the preset model may comprise a plurality of languages, for example, Japanese and English.

It should be appreciated that the structure of the multilingual representation model is various, and may be selected by those skilled in the art according to an application scenario. In an alternative embodiment, as shown in FIG. 3, the multilingual representation model comprises a cascade of one or more representation sub-layers. Specifically, if the multilingual representation model is composed of one representation sub-layer, the one representation sub-layer is the multilingual representation model; if the multi-lingual representation model is composed of two representation sub-layers, the two representation sub-layers being a first representation sub-layer and a second representation sub-layer respectively, the multilingual representation model is obtained by cascading the two representation sub-layers. Specifically, an input of the multilingual representation model is the input of the first representation sub-layer, an output of the first representation sub-layer is the input of the second representation sub-layer, and the output of the second representation sub-layer is the output of the multilingual representation model; if the multilingual representation model comprises a plurality of representation sub-layers, a method of cascading the plurality of representation sub-layers is similar to the method of cascading the two representation sub-layers described above, and will not be described in detail here.

In the above-mentioned multilingual representation model, each representation sub-layer comprises: a self-attention layer and a feedforward neural network layer; in an alternative embodiment, the number of the self-attention layer is one, the number of the feedforward neural network layer is one, and a corresponding connection method is: the input of the representation sub-layer is the input of the self-attention layer, the output of the self-attention layer is the input of the feed-forward network layer, and the output of the feed-forward neural network layer is the output of the representation sub-layer. Alternatively, the multilingual representation model is mBERT.

Step 203: obtaining that a language material in the monolingual corpus of each language contains a predicted next slot information, and obtaining prediction information which is marked and corresponds to the predicted next slot information.

In order to make the vector representation sentence generated by the second translation model for the sentence that has been translated more accurate, thereby more accurately predicting sentences to be translated subsequently, the preset model is trained using the language material containing the predicted next slot information and its corresponding prediction information.

In the present embodiment, a prediction process is performed on the language material in the monolingual corpus of each language; the prediction process refers to removing one or more words at the end of the language material. After the prediction process is performed on the language material, a slot of a word to be predicted is slot information corresponding to next word at the end of the language material, and the prediction information is the word corresponding to the slot information. For example, if the language material before the prediction processing is "我中午吃完 午饭在休息 (I am taking a rest after lunch)", the language material containing the predicted next slot information may be "我 中午吃完* (I finished eating * at noon)", wherein "*" represents the next slot information, and the prediction information corresponding to the next slot information is "午饭 (lunch)".

Step 204: generating the multilingual generation model by training model parameters of a preset model according to a monolingual language material containing the predicted next slot information and a language material with corresponding prediction information, and a preset second loss function.

In the present embodiment, the second loss function is used to evaluate a difference between a predicted value and a real value of the model to converge a training result of the model. Under the constraint of the second loss function, the model parameters of the preset model are trained using the monolingual language material containing the predicted next slot information and the language material with the corresponding prediction information. The language generation model obtained by training may predict the following text in conjunction with the already-existing language materials, i.e., according to the context and generate a highly-accurate sentence. It should be appreciated that the language materials for training the preset model may comprise a plurality of languages, for example, Japanese and English.

Figure 4:
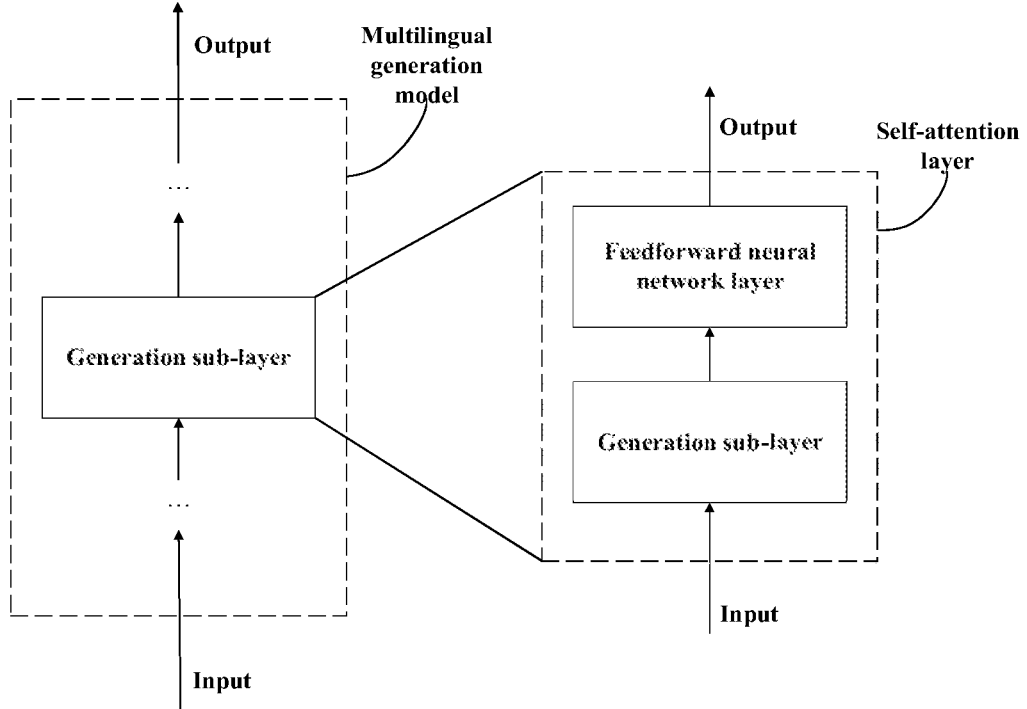
FIG. 4 is a schematic structural diagram of a multilingual generation model according to an embodiment of the present disclosure.

It should be appreciated that the structure of the multilingual generation model is various, and may be selected by those skilled in the art according to an application scenario. In an alternative embodiment, as shown in FIG. 4, the multilingual generation model comprises a cascade of one or more generation sub-layers. If the multilingual generation model is composed of one generation sub-layer, the one generation sub-layer is the multilingual generation model; if the multilingual generation model is composed of two generation sub-layers, namely, a first generation sub-layer and a second generation sub-layer respectively, the multilingual generation model is obtained by cascading the two generation sub-layers. Specifically, an input of the multilingual generation model is the input of the first generation sub-layer, an output of the first generation sub-layer is the input of the second generation sub-layer, and the output of the second generation sub-layer is the output of the multilingual generation model; if the multilingual generation model comprises a plurality of generation sub-layers, a method of cascading the plurality of generation sub-layers is similar to the method of cascading the two generation sub-layers described above, and will not be described in detail here.

In the above-mentioned multilingual generation model, each generation sub-layer comprises: a self-attention layer and a feedforward neural network layer; in an alternative embodiment, the number of the self-attention layer is one, the number of the feedforward neural network layer is one, and a corresponding connection method is: the input of the generation sub-layer is the input of the self-attention layer, the output of the self-attention layer is the input of the feed-forward network layer, and the output of the feedforward neural network layer is the output of the generation sub-layer. Alternatively, the multilingual generation model is mGPT.

Step 205: connecting the feedforward neural network layer in the last representation sub-layer in the multilingual representation model with the self-attention layer in a first encoding sub-layer in the encoder, connecting the feedforward neural network layer in the last generation sub-layer in the multilingual generation model with the self-attention layer in a first decoding sub-layer in the decoder, and connecting the multilingual generation model with the output layer to generate a target model to be trained.

In the present embodiment, the first translation model comprises: an encoder, a decoder, and an output layer, wherein:

the encoder configured to encode and comprising: a cascade of one or more encoding sub-layers, each encoding sub-layer comprising: a self-attention layer and a feedforward neural network layer. In an alternative embodiment, as shown in the encoding sub-layer in FIG. 5, the encoding sub-layer is formed by connecting the self-attention layer with the feedforward neural network layer.

the decoder configured to decode and comprising: a cascade of one or more decoding sub-layers, each decoding sub-layer comprising: a self-attention layer, a cross-attention layer and a feedforward neural network layer. In an alternative embodiment, as shown in the decoding sub-layer of FIG. 5, the decoding sub-layer is formed by connecting the self-attention layer with the cross-attention layer, and by connecting the cross-attention layer with the feedforward neural network layer. It should be appreciated that the capture of source information may be accomplished because the cross-attention layer is included in the decoder.

The output layer in the first translation model may be in multiple types such as sigmoid function and softmax function, may be selected according to the application scenario, and is not limited in the present embodiment. In an alternative embodiment, the output layer is a softmax function.

Figure 5:
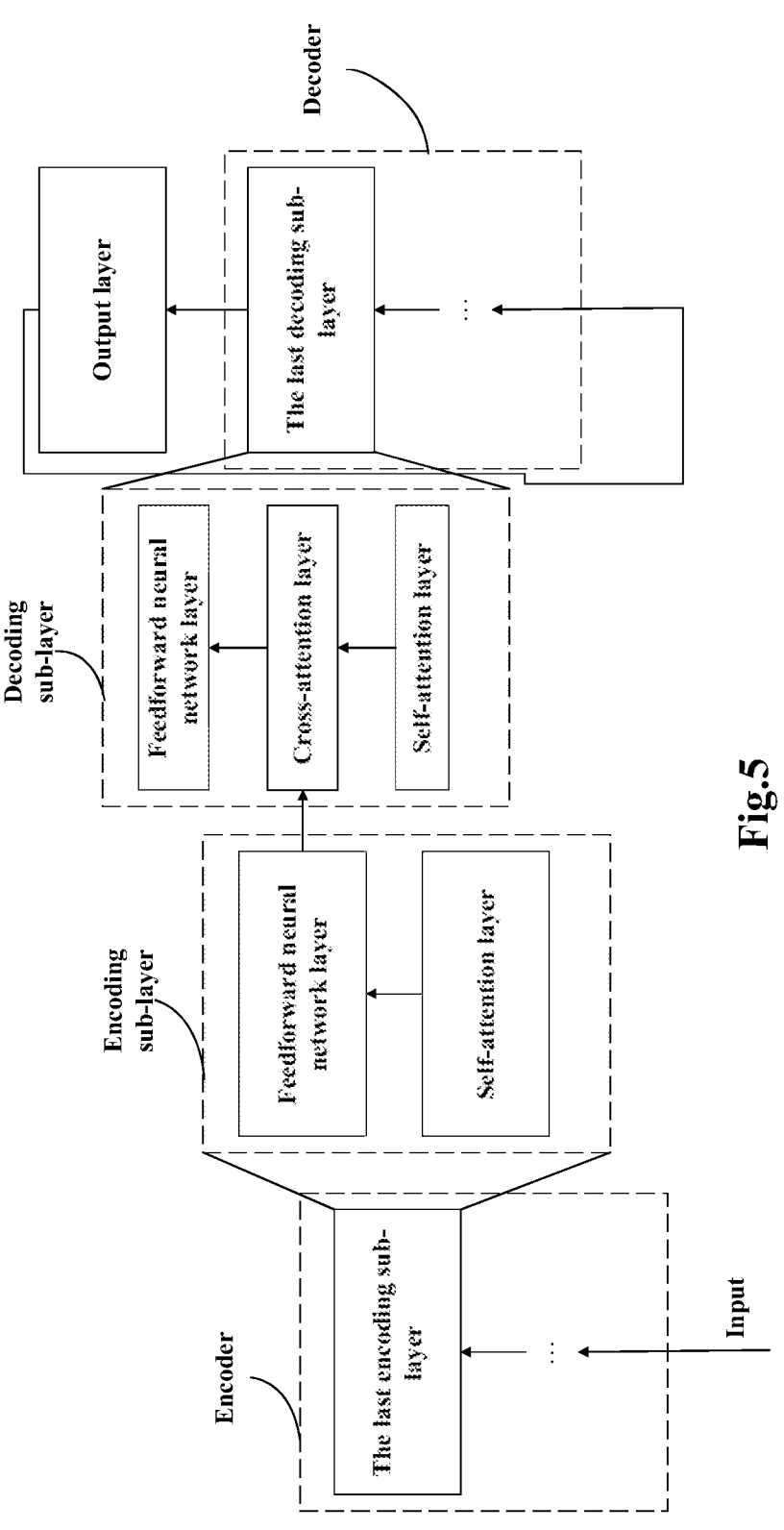
FIG. 5 is a schematic structural diagram of a first translation model according to an embodiment of the present disclosure.

It needs to be appreciated that when the encoder and decoder are concatenated, the feedforward neural network layer in the last encoding sub-layer is concatenated with the cross-attention layer in the last decoding sub-layer as shown in FIG. 5.

Figure 6:
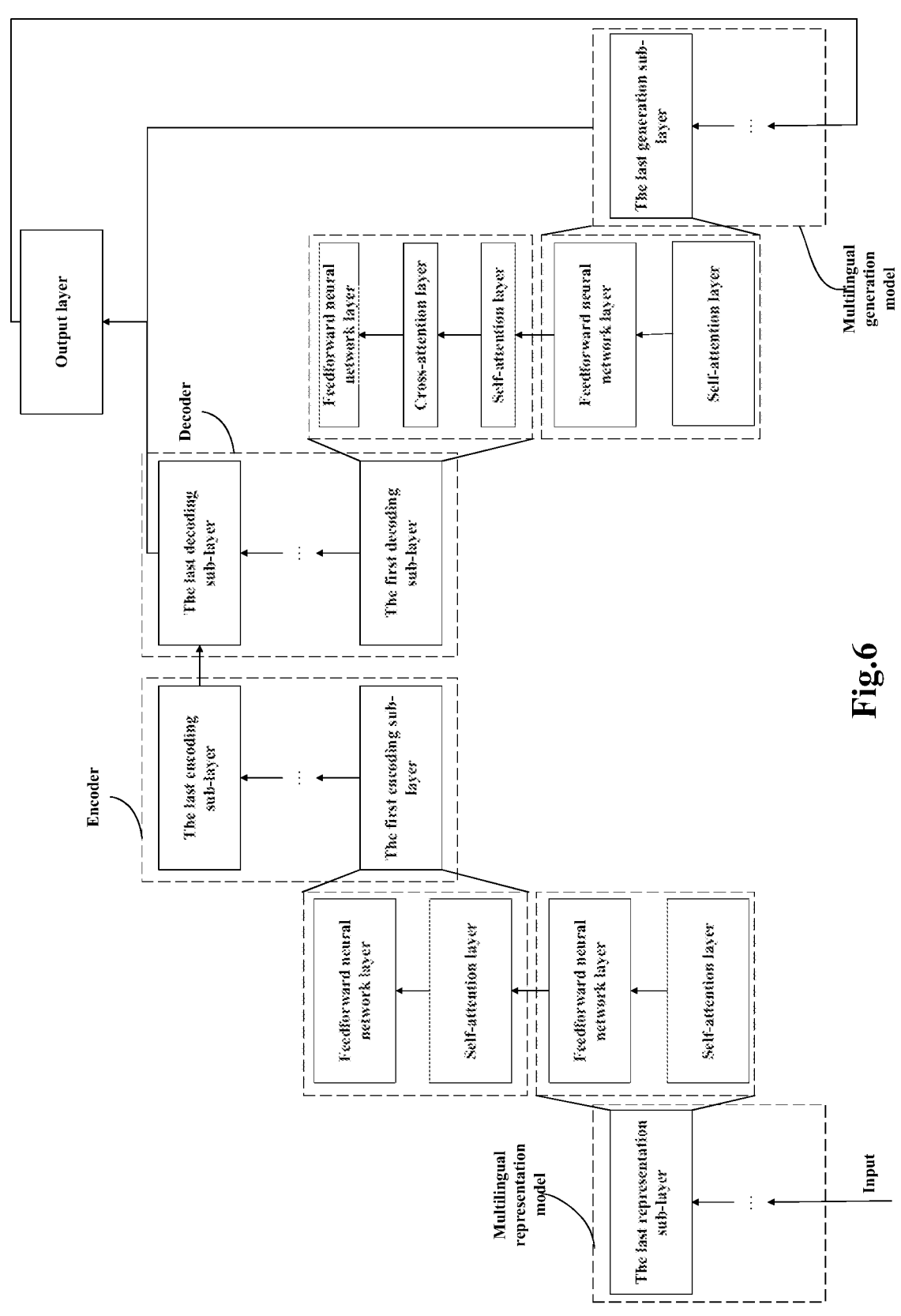
FIG. 6 is a schematic structural diagram of a target model according to an embodiment of the present disclosure.

In this example, the multilingual representation model is connected with the encoder of the first translation model, and the multilingual generation model is connected with the decoder of the first translation model. As shown in FIG. 6, specifically:

Connecting the multilingual representation model with the encoder of the first translation model means connecting the feedforward neural network layer in the last representation sub-layer in the multilingual representation model with the self-attention layer in the first encoding sub-layer in the encoder. Connecting the multilingual generation model with the decoder of the first translation model means connecting the feedforward neural network layer in the last generation sub-layer in the multilingual generation model with the self-attention layer in a first decoding sub-layer in the decoder. The output of the multilingual generation model and the output of the decoder together serves as the input of the output layer, and the output of the output layer serves as the input of the multilingual generation model, thereby connecting the multilingual generation model with the output layer to generate the target model to be trained.

Step 206: training model parameters of the multilingual representation model and the first translation model in the target model according to bilingual corpora of the plurality of languages and a preset third loss function.

Step 207: generating a second translation model according to the trained model parameters of the multilingual representation model and the first translation model, and performing translation processing on target information to be processed according to the second translation model.

In the present embodiment, a difference between a predicted value and a real value of the target model is evaluated using the third loss function, to converge a training result of the target model, and the third loss function may be selected according to the application scenario, and is not limited in the present embodiment. In the present embodiment, in order to improve the accuracy of the vector representation of the translated sentence, the multilingual representation model and the first translation model in the target model are trained, and the corpus used in the training is a bilingual corpus in the plurality of languages. Thus, under the constraint of the third loss function, upon training, the language material in the bilingual corpus may be taken as the input of the target model, and a translation language material corresponding to the language material may be taken as the output of the target model, namely, the parameters of the multilingual representation model and the first translation model in the target model are trained. Then, the second translation model is generated according to the trained model parameters of the multilingual representation model and the first translation model and the model parameters of the multilingual generation model before the training, and the translation processing is performed on the target information to be processed according to the second translation model.

In summary, the translation processing method of an embodiment of the present disclosure introduces in detail an optional technical solution of connecting the multilingual representation model, the first translation model and the multilingual processing model; the accuracy of the language generated by the second translation model generated according to the technical solution is higher, the translation quality is improved, and the accuracy of the generated translation sentence is further enhanced by using, in the second translation model, untrained model parameters of the multilingual generation model in the target model.

Figure 7:
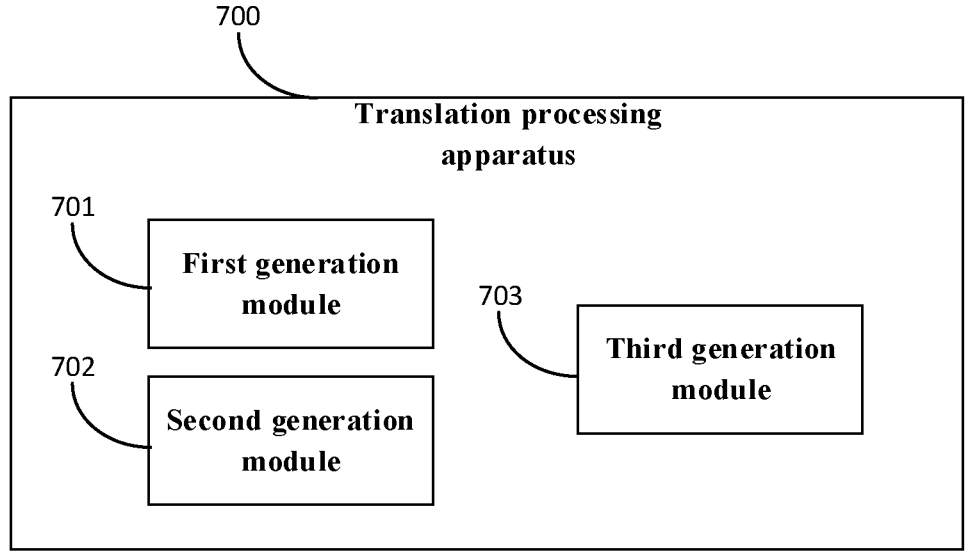
FIG. 7 is a schematic structural diagram of a translation processing apparatus according to an embodiment of the present disclosure.

FIG. 7 is a schematic structural diagram of a translation processing apparatus according to an embodiment of the present disclosure. The apparatus may be implemented by software and/or hardware, and may be generally integrated in an electronic device. As shown in FIG. 7, the translation processing apparatus 700 comprises:

a first generation module 701 configured to generate a multilingual representation model by training according to a monolingual corpus of each language among a plurality of languages, and generate a multilingual generation model according to the monolingual corpus of each language;

a second generation module 702 configured to concatenate the multilingual representation model and the multilingual generation model with a first translation model respectively to generate a target model to be trained;

a third generation module 703 configured to generate a second translation model by training the target model according to a bilingual corpus among the plurality of languages, and perform translation processing on target information to be processed, according to the second translation model.

Optionally, the first generation module 701 is configured to:

obtain vacant slot information contained in a language material in a monolingual corpus of each language, and obtain filling information which is marked and corresponds to the vacant slot information;

generate the multilingual representation model by training model parameters of a preset model according to a monolingual language material containing the vacant slot information and a language material with the corresponding filling information, and a preset first loss function.

Optionally, the first generation module 701 is configured to:

obtain that a language material in the monolingual corpus of each language contains a predicted next slot information, and obtain prediction information which is marked and corresponds to the predicted next slot information;

generate the multilingual generation model by training model parameters of a preset model according to a monolingual language material containing the predicted next slot information and a language material with the corresponding prediction information, and a preset second loss function.

Optionally, the multilingual representation model comprises a cascade of one or more representation sub-layers, wherein each of the representation sub-layers comprises: a self-attention layer connected with a feedforward neural network layer.

Optionally, the multilingual generation model comprises a cascade of one or more generation sub-layers, wherein each of the generation sub-layers comprises: a self-attention layer connected with a feedforward neural network layer.

Optionally, the first translation model comprises an encoder, a decoder and an output layer, wherein the encoder comprises: a cascade of one or more encoding sub-layers, wherein each of the encoding sub-layers comprises: a self-attention layer connected with a feedforward neural network layer;

the decoder comprises: a cascade of one or more decoding sub-layers, wherein each of the decoding sub-layers comprises: a self-attention layer connected with a cross-attention layer, and a feedforward neural network layer connected with the cross-attention layer, wherein the feedforward neural network layer in the last one of the encoding sub-layers is connected with the cross-attention layer in the last one of the decoding sub-layers.

Optionally, the second generation module 702 is configured to:

connect the feedforward neural network layer in the last one of the representation sub-layer in the multilingual representation model with the self-attention layer in a first one of the encoding sub-layers in the encoder, and connect the feedforward neural network layer in the last one of the generation sub-layers in the multilingual generation model with the self-attention layer in a first one of the decoding sub-layers in the decoder, and connect the multilingual generation model with the output layer to generate a target model to be trained.

Optionally, the third generation module 703 is configured to:

train model parameters of the multilingual representation model and the first translation model in the target model according to bilingual corpora of the plurality of languages and a preset third loss function;

generate the second translation model according to the trained model parameters of the multilingual representation model and the first translation model and the model parameters of the multilingual generation model before the training.

The translation processing apparatus according to the embodiments of the present disclosure may perform the translation processing method according to any embodiments of the present disclosure, and has functional modules and advantageous effects corresponding to the performed method.

Embodiments of the present disclosure further provide a computer program product comprising computer programs/instructions which, when executed by a processor, implement the translation processing method according to any of the embodiments of the present disclosure.

Figure 8:
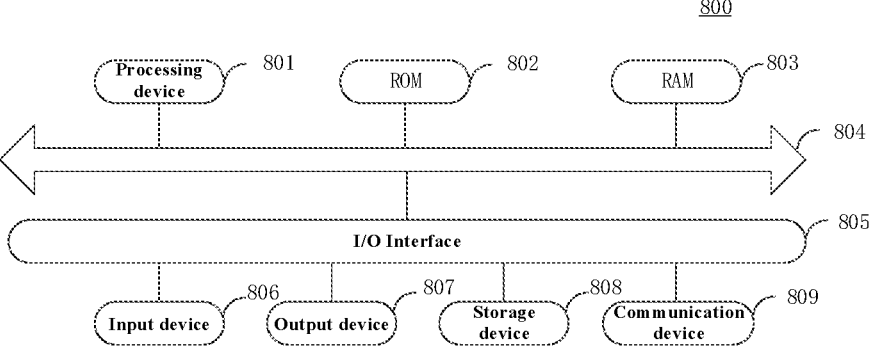
FIG. 8 is a schematic structural diagram of an electronic device according to an embodiment of the present disclosure.

FIG. 8 is a schematic structural diagram of an electronic device according to an embodiment of the present disclosure.

Reference is now made to FIG. 8, which illustrates a structural schematic diagram of an electronic device 800 suitable for implementing embodiments of the present disclosure. The electronic device 800 in embodiments of the present disclosure may comprise, but not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. The electronic device shown in FIG. 8 is merely an example and should not impose any limitations on the functionality and scope of use of embodiments of the present disclosure.

As shown in FIG. 8, the electronic device 800 may comprise a processing device (e.g., a central processing unit, a graph processor, etc.) 801 that may perform various suitable actions and processes in accordance with a program stored in a read only memory (ROM) 802 or a program loaded from a storage device 808 into a random access memory (RAM) 803. In the RAM 803, various programs and data needed by the operation of the electronic device 800 are also stored. The processing device 801, the ROM 802, and the RAM 803 are connected to each other via a bus 804. An input/output (I/O) interface 805 is also coupled to bus 804.

In general, the following devices may be connected to the I/O interface 805: an input device 806 including, for example, a touch screen, a touch pad, a keyboard, a mouse, a camera, a microphone, an accelerometer, a gyroscope, etc.; an output device 807 including, for example, a liquid crystal display (LCD), a speaker, a vibrator, etc.; a storage device 808 including, for example, a magnetic tape, a hard disk, etc.; and a communication device 809. The communication device 809 may allow the electronic device 800 to communicate in a wireless or wired manner with other devices to exchange data. While FIG. 8 illustrates the electronic device 800 having various devices, it is to be understood that not all illustrated device are required to be implemented or provided. More or fewer devices may alternatively be implemented or provided.

In particular, the processes described above with reference to flow charts may be implemented as computer software programs in accordance with embodiments of the present disclosure. For example, embodiments of the present disclosure comprise a computer program product comprising a computer program carried on a computer-readable medium, the computer program comprising program code for performing the method illustrated by the flow charts. In such embodiments, the computer program may be downloaded and installed from a network via the communication means 809, or installed from the storage device 808, or installed from the ROM 802. When the computer program is executed by the processing device 801, the above-described functions defined in the translation processing method of the embodiment of the present disclosure are performed.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

In some embodiments, the terminal, server may communicate using any currently known or future-developed network protocol, such as HTTP (HyperText Transfer Protocol), and may be interconnected with any form or medium of digital data communication (e.g., a communication network). Examples of the communication network comprise local area networks ("LANs"), wide area networks ("WANs"), international networks (e.g., the Internet), and peer-to-peer networks (e.g., ad hoc peer-to-peer networks), as well as any currently known or future-developed networks.

The computer readable medium may be contained in the above-described electronic device; it may also be present separately and not installed into the electronic device.

The computer-readable medium carries one or more programs that, when executed by the electronic device, cause the electronic device to perform the following: generating a multilingual representation model by training according to a monolingual corpus of each language among a plurality of languages, and generating a multilingual generation model according to the monolingual corpus of each language; concatenating the multilingual representation model and the multilingual generation model with a first translation model respectively to generate a target model to be trained; generating a second translation model by training the target model according to a bilingual corpus among the plurality of languages, and performing translation processing on target information to be processed, according to the second translation model. In embodiments of the present disclosure, the multilingual representation model can more accurately extract features of a sentence to be translated, and the multilingual generation model can more accurately predict subsequent sentences to be translated. Therefore, since the second translation model improves the translation accuracy and thereby enhances the translation quality as concatenating the multilingual representation model and the multilingual generation model.

The computer program code for carrying out operations of the present disclosure may be written in one or more programming languages or combinations thereof. The programming languages include, but not limited to, object-oriented programming languages, such as Java, smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The units described in connection with the embodiments disclosed herein may be implemented in a software or hardware manner. The names of the units do not constitute limitations of the units themselves in a certain case.

The functions described herein above may be performed, at least in part, by one or more hardware logic components. For example, without limitation, exemplary types of hardware logic components that may be used comprise: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electro-magnetic, infrared, or semiconductor system, apparatus, or device, or any suitable combinations thereof. More specific examples of the machine-readable storage medium would comprise an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

According to one or more embodiments of the present disclosure, the present disclosure provides a translation processing method, comprising:

generating a multilingual representation model by training according to a monolingual corpus of each language among a plurality of languages, and generating a multilingual generation model according to the monolingual corpus of each language;

concatenating the multilingual representation model and the multilingual generation model with a first translation model respectively to generate a target model to be trained;

generating a second translation model by training the target model according to a bilingual corpus among the plurality of languages, and performing translation processing on target information to be processed, according to the second translation model.

According to one or more embodiments of the present disclosure, in the translation processing method according to the present disclosure, generating a multilingual representation model by training according to a monolingual corpus of each language among a plurality of languages comprises:

obtaining vacant slot information contained in a language material in a monolingual corpus of each language, and obtaining filling information which is marked and corresponds to the vacant slot information;

generating the multilingual representation model by training model parameters of a preset model according to a monolingual language material containing the vacant slot information and a language material with the corresponding filling information, and a preset first loss function.

According to one or more embodiments of the present disclosure, in the translation processing method according to the present disclosure, the generating a multilingual generation model according to the monolingual corpus of each language comprises:

obtaining that a language material in the monolingual corpus of each language contains a predicted next slot information, and obtaining prediction information which is marked and corresponds to the predicted next slot information;

generating the multilingual generation model by training model parameters of a preset model according to a monolingual language material containing the predicted next slot information and a language material with the corresponding prediction information, and a preset second loss function.

According to one or more embodiments of the present disclosure, in the translation processing method according to the present disclosure, the multilingual representation model comprises a cascade of one or more representation sub-layers, wherein each of the representation sub-layers comprises: a self-attention layer connected with a feedforward neural network layer.

According to one or more embodiments of the present disclosure, in the translation processing method according to the present disclosure, the multilingual generation model comprises a cascade of one or more generation sub-layers, wherein each of the generation sub-layers comprises: a self-attention layer connected with a feedforward neural network layer.

According to one or more embodiments of the present disclosure, in the translation processing method according to the present disclosure, the first translation model comprises an encoder, a decoder and an output layer, wherein the encoder comprises a cascade of one or more encoding sub-layers, wherein each of the encoding sub-layers comprises: a self-attention layer connected with a feedforward neural network layer;

the decoder comprises a cascade of one or more decoding sub-layers, wherein each of the decoding sub-layers comprises: a self-attention layer connected with a cross-attention layer, and a feedforward neural network layer connected with the cross-attention layer, wherein the feedforward neural network layer in the last one of the encoding sub-layers is connected with the cross-attention layer in the last one of the decoding sub-layers.

According to one or more embodiments of the present disclosure, in the translation processing method according to the present disclosure, the concatenating the multilingual representation model and the multilingual generation model with a first translation model respectively to generate a target model to be trained comprises:

connecting the feedforward neural network layer in the last one of the representation sub-layers in the multilingual representation model with the self-attention layer in a first one of the encoding sub-layers in the encoder, and connecting the feedforward neural network layer in the last one of the generation sub-layers in the multilingual generation model with the self-attention layer in a first one of the decoding sub-layers in the decoder, and connecting the multilingual generation model with the output layer to generate a target model to be trained.

According to one or more embodiments of the present disclosure, in the translation processing method according to the present disclosure, the generating a second translation model by training the target model according to a bilingual corpus among the plurality of languages comprises:

training model parameters of the multilingual representation model and the first translation model in the target model according to bilingual corpora of the plurality of languages and a preset third loss function;

generating the second translation model according to the trained model parameters of the multilingual representation model and the first translation model and the model parameters of the multilingual generation model before the training.

According to one or more embodiments of the present disclosure, the present disclosure provides a translation processing apparatus, comprising:

a first generation module configured to generate a multilingual representation model by training according to a monolingual corpus of each language among a plurality of languages, and generate a multilingual generation model according to the monolingual corpus of each language;

a second generation module configured to concatenate the multilingual representation model and the multilingual generation model with a first translation model respectively to generate a target model to be trained;

a third generation module configured to generate a second translation model by training the target model according to a bilingual corpus among the plurality of languages, and perform translation processing on target information to be processed, according to the second translation model.

According to one or more embodiments of the present disclosure, in the translation processing apparatus according to the present disclosure, the first generation module is configured to:

obtain vacant slot information contained in a language material in a monolingual corpus of each language, and obtain filling information which is marked and corresponds to the vacant slot information;

generate the multilingual representation model by training model parameters of a preset model according to a monolingual language material containing the vacant slot information and a language material with the corresponding filling information, and a preset first loss function.

According to one or more embodiments of the present disclosure, in the translation processing apparatus according to the present disclosure, the first generation module is configured to:

obtain that a language material in the monolingual corpus of each language contains a predicted next slot information, and obtain prediction information which is marked and corresponds to the predicted next slot information;

generate the multilingual generation model by training model parameters of a preset model according to a monolingual language material containing the predicted next slot information and a language material with the corresponding prediction information, and a preset second loss function.

According to one or more embodiments of the present disclosure, in the translation processing apparatus according to the present disclosure, the multilingual representation model comprises a cascade of one or more representation sub-layers, wherein each of the representation sub-layers comprises: a self-attention layer connected with a feedforward neural network layer.

According to one or more embodiments of the present disclosure, in the translation processing apparatus according to the present disclosure, the multilingual generation model comprises a cascade of one or more generation sub-layers, wherein each of the generation sub-layers comprises: a self-attention layer connected with a feedforward neural network layer.

According to one or more embodiments of the present disclosure, in the translation processing apparatus according to the present disclosure, the first translation model comprises an encoder, a decoder and an output layer, wherein the encoder comprises: a cascade of one or more encoding sub-layers, wherein each of the encoding sub-layers comprises: a self-attention layer and a feedforward neural network layer connection;

the decoder comprises: a cascade of one or more decoding sub-layers, wherein each of the decoding sub-layers comprises: a self-attention layer connected with a cross-attention layer, and a feedforward neural network layer connected with the cross-attention layer, wherein the feedforward neural network layer in the last one of the encoding sub-layers is connected with the cross-attention layer in the last one of the decoding sub-layers.

According to one or more embodiments of the present disclosure, in the translation processing apparatus according to the present disclosure, the second generation module is configured to:

connect the feedforward neural network layer in the last one of the representation sub-layers in the multilingual representation model with the self-attention layer in a first one of the encoding sub-layers in the encoder, and connect the feedforward neural network layer in the last one of the generation sub-layers in the multilingual generation model with the self-attention layer in a first one of the decoding sub-layers in the decoder, and connect the multilingual generation model with the output layer to generate a target model to be trained.

According to one or more embodiments of the present disclosure, in the translation processing apparatus according to the present disclosure, the third generation module is configured to:

train model parameters of the multilingual representation model and the first translation model in the target model according to bilingual corpora of the plurality of languages and a preset third loss function;

generate the second translation model according to the trained model parameters of the multilingual representation model and the first translation model and the model parameters of the multilingual generation model before the training.

According to one or more embodiments of the present disclosure, the present disclosure provides an electronic device, comprising:

a processor;

a memory for storing instructions executable by the processor;

the processor is configured to read the executable instructions from the memory and execute the instructions to implement the translation processing method according to the present disclosure.

According to one or more embodiments of the present disclosure, the present disclosure provides a computer-readable storage medium storing a computer program for executing the translation processing method according to the present disclosure.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also include other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. A translation processing method, wherein the translation processing method comprises:

generating a multilingual representation model by training according to a monolingual corpus of each language among a plurality of languages, and generating a multilingual generation model according to the monolingual corpus of each language;

concatenating the multilingual representation model and the multilingual generation model with a first translation model respectively to generate a target model to be trained;

generating a second translation model by training the target model according to a bilingual corpus among the plurality of languages, and performing translation processing on target information to be processed, according to the second translation model;

wherein generating the multilingual representation model by training according to a monolingual corpus of each language among a plurality of languages comprises:

obtaining vacant slot information contained in a language material in a monolingual corpus of each language, and obtaining filling information which is marked and corresponds to the vacant slot information;

generating the multilingual representation model by training model parameters of a preset model according to a monolingual language material containing the vacant slot information and a language material with the corresponding filling information, and a preset first loss function.

2. The method according to claim 1, wherein generating the multilingual generation model according to the monolingual corpus of each language comprises:

obtaining that a language material in the monolingual corpus of each language contains a predicted next slot information, and obtaining prediction information which is marked and corresponds to the predicted next slot information;

generating the multilingual generation model by training model parameters of a preset model according to a monolingual language material containing the predicted next slot information and a language material with the corresponding prediction information, and a preset second loss function.

3. The method according to claim 1, wherein the multilingual representation model comprises a cascade of one or more representation sub-layers, wherein each of the representation sub-layers comprises: a self-attention layer connected with a feedforward neural network layer.

4. The method according to claim 3, wherein the multilingual generation model comprises a cascade of one or more generation sub-layers, wherein each of the generation sub-layers comprises: a self-attention layer connected with a feedforward neural network layer.

5. The method according to claim 4, wherein the first translation model comprises an encoder, a decoder and an output layer, wherein the encoder comprises a cascade of one or more encoding sub-layers, wherein each of the encoding sub-layers comprises: a self-attention layer connected with a feedforward neural network layer;

the decoder comprises a cascade of one or more decoding sub-layers, wherein each of the decoding sub-layers comprises: a self-attention layer connected with a cross-attention layer, and the cross-attention layer is connected with the feedforward neural network layer, wherein the feedforward neural network layer in the last one of the encoding sub-layers is connected with the cross-attention layer in the last one of the decoding sub-layers.

6. The method according to claim 5, wherein concatenating the multilingual representation model and the multilingual generation model with a first translation model respectively to generate a target model to be trained comprises:

connecting the feedforward neural network layer in the last one of the representation sub-layers in the multilingual representation model with the self-attention layer in a first one of the encoding sub-layers in the encoder, and connecting the feedforward neural network layer in the last one of the generation sub-layers in the multilingual generation model with the self-attention layer in a first one of the decoding sub-layers in the decoder, and connecting the multilingual generation model with the output layer to generate a target model to be trained.

7. The method according to claim 1, wherein generating the second translation model by training the target model according to a bilingual corpus among the plurality of languages comprises:

training model parameters of the multilingual representation model and the first translation model in the target model according to bilingual corpora of the plurality of languages and a preset third loss function;

generating the second translation model according to the trained model parameters of the multilingual representation model and the first translation model and the model parameters of the multilingual generation model before the training.

8. An electronic device, wherein the electronic device comprises:

a processor;

a memory for storing instructions executable by the processor;

the processor is configured to read the executable instructions from the memory and execute the instructions to:

generate a multilingual representation model by training according to a monolingual corpus of each language among a plurality of languages, and generating a multilingual generation model according to the monolingual corpus of each language;

concatenate the multilingual representation model and the multilingual generation model with a first translation model respectively to generate a target model to be trained;

generate a second translation model by training the target model according to a bilingual corpus among the plurality of languages, and performing translation processing on target information to be processed, according to the second translation model;

wherein the processor is further configured to:

obtain vacant slot information contained in a language material in a monolingual corpus of each language, and obtain filling information which is marked and corresponds to the vacant slot information;

generate the multilingual representation model by training model parameters of a preset model according to a monolingual language material containing the vacant slot information and a language material with the corresponding filling information, and a preset first loss function.

9. A non-transitory computer-readable storage medium, wherein the computer-readable storage medium stores instructions therein which, when executed on a terminal device, cause the terminal device to generate a multilingual representation model by training according to a monolingual corpus of each language among a plurality of languages, and generating a multilingual generation model according to the monolingual corpus of each language;

concatenate the multilingual representation model and the multilingual generation model with a first translation model respectively to generate a target model to be trained;

generate a second translation model by training the target model according to a bilingual corpus among the plurality of languages, and performing translation processing on target information to be processed, according to the second translation model;

wherein the device is further configured to:

obtain vacant slot information contained in a language material in a monolingual corpus of each language, and obtain filling information which is marked and corresponds to the vacant slot information;

generate the multilingual representation model by training model parameters of a preset model according to a monolingual language material containing the vacant slot information and a language material with the corresponding filling information, and a preset first loss function.

10. The electronic device according to claim 8, wherein the processor is further configured to:

obtain that a language material in the monolingual corpus of each language contains a predicted next slot information, and obtaining prediction information which is marked and corresponds to the predicted next slot information;

generate the multilingual generation model by training model parameters of a preset model according to a monolingual language material containing the predicted next slot information and a language material with the corresponding prediction information, and a preset second loss function.

11. The electronic device according to claim 8, wherein the multilingual representation model comprises a cascade of one or more representation sub-layers, wherein each of the representation sub-layers comprises: a self-attention layer connected with a feedforward neural network layer.

12. The electronic device according to claim 11, wherein the multilingual generation model comprises a cascade of one or more generation sub-layers, wherein each of the generation sub-layers comprises: a self-attention layer connected with a feedforward neural network layer.

13. The electronic device according to claim 12, wherein the first translation model comprises an encoder, a decoder and an output layer, wherein the encoder comprises a cascade of one or more encoding sub-layers, wherein each of the encoding sub-layers comprises: a self-attention layer connected with a feedforward neural network layer;

the decoder comprises a cascade of one or more decoding sub-layers, wherein each of the decoding sub-layers comprises: a self-attention layer connected with a cross-attention layer, and the cross-attention layer is connected with the feedforward neural network layer, wherein the feedforward neural network layer in the last one of the encoding sub-layers is connected with the cross-attention layer in the last one of the decoding sub-layers.

14. The electronic device according to claim 13, wherein the processor is further configured to:

connect the feedforward neural network layer in the last one of the representation sub-layers in the multilingual representation model with the self-attention layer in a first one of the encoding sub-layers in the encoder, and connect the feedforward neural network layer in the last one of the generation sub-layers in the multilingual generation model with the self-attention layer in a first one of the decoding sub-layers in the decoder, and connecting the multilingual generation model with the output layer to generate a target model to be trained.

15. The electronic device according to claim 8, wherein the processor is further configured to:

train model parameters of the multilingual representation model and the first translation model in the target model according to bilingual corpora of the plurality of languages and a preset third loss function;

generate the second translation model according to the trained model parameters of the multilingual representation model and the first translation model and the model parameters of the multilingual generation model before the training.

16. The non-transitory computer-readable storage medium according to claim 9, wherein the device is further caused to:

obtain that a language material in the monolingual corpus of each language contains a predicted next slot information, and obtaining prediction information which is marked and corresponds to the predicted next slot information;

generate the multilingual generation model by training model parameters of a preset model according to a monolingual language material containing the predicted next slot information and a language material with the corresponding prediction information, and a preset second loss function.

* * * * *